US008732962B2

(12) United States Patent  
Laett

(10) Patent No.: US 8,732,962 B2  
(45) Date of Patent: May 27, 2014

(54) HAND-HELD POWER TOOL DEVICE

(75) Inventor: Michael Laett, Muehledorf (CH)

(73) Assignee: Robert Bosch GmbH, Stuttgart (DE)

( * ) Notice: Subject to any disclaimer, the term of this patent is extended or adjusted under 35 U.S.C. 154(b) by 688 days.

(21) Appl. No.: 12/644,925

(22) Filed: Dec. 22, 2009

(65) Prior Publication Data

US 2010/0154230 A1 Jun. 24, 2010

(30) Foreign Application Priority Data

Dec. 22, 2008 (DE) .................. 10 2008 055 065

(51) Int. Cl.
*B23D 49/10* (2006.01)

(52) U.S. Cl.
USPC .......................................................... 30/392

(58) Field of Classification Search
USPC ................... D8/64; 30/375, 376, 392–394
See application file for complete search history.

(56) References Cited

U.S. PATENT DOCUMENTS

| | | | | |
|---|---|---|---|---|
| 2,998,830 A * | 9/1961 | Atkinson | ........................ | 30/376 |
| 3,087,519 A * | 4/1963 | McCarty et al. | ................ | 30/376 |
| 3,131,736 A * | 5/1964 | Ristow et al. | .................... | 30/376 |
| 3,146,809 A * | 9/1964 | Botefuhr | ......................... | 30/376 |
| 3,339,598 A * | 9/1967 | Frostad | ........................... | 30/376 |
| 3,863,342 A * | 2/1975 | Griffies et al. | ................. | 30/393 |
| T941,019 I4 * | 12/1975 | Kranzler et al. | ............... | 30/376 |
| 3,938,251 A * | 2/1976 | Kareman | ........................ | 30/376 |
| 3,942,251 A * | 3/1976 | Griffies et al. | .................. | 30/376 |
| 5,617,638 A * | 4/1997 | Amano et al. | .................. | 30/376 |
| 5,644,845 A * | 7/1997 | Durr et al. | ........................ | 30/376 |
| 6,230,411 B1 * | 5/2001 | Wall et al. | ........................ | 30/376 |
| 6,553,675 B2 * | 4/2003 | Orrico | ............................. | 30/376 |
| 6,705,017 B2 * | 3/2004 | Ellis et al. | ........................ | 30/375 |
| 7,065,884 B2 * | 6/2006 | Tam et al. | ........................ | 30/376 |
| 7,296,356 B2 * | 11/2007 | Ngan et al. | ..................... | 30/376 |
| 8,024,865 B2 * | 9/2011 | Kaiser et al. | .................... | 30/392 |
| 2004/0168561 A1 | 9/2004 | Tam et al. | | |
| 2006/0179668 A1 * | 8/2006 | Wu | ................................. | 30/392 |
| 2009/0077814 A1 * | 3/2009 | Gibbons et al. | ................. | 30/376 |
| 2010/0032178 A1 * | 2/2010 | Koeder et al. | ................... | 30/376 |
| 2010/0307012 A1 * | 12/2010 | Canas Fontan | ................. | 30/376 |

FOREIGN PATENT DOCUMENTS

| | | | |
|---|---|---|---|
| DE | 19926387 A1 | | 12/2000 |
| EP | 603552 A1 | * | 6/1994 |
| EP | 2039454 A2 | | 3/2009 |
| GB | 2337228 A | | 11/1999 |
| GB | 2464390 A | * | 4/2010 |
| GB | 2466382 A | * | 6/2010 |
| JP | 07060538 A | * | 3/1995 |
| WO | 2009097396 A1 | | 8/2009 |

* cited by examiner

*Primary Examiner* — Jason Daniel Prone
(74) *Attorney, Agent, or Firm* — Maginot, Moore & Beck

(57) ABSTRACT

The invention is based on a hand-held power tool device, in particular a jigsaw device, having an adjusting device, which is equipped with a lever element and a mounting element for accommodating the lever element. As proposed in the invention, the mounting element is composed of a one-piece element extending 360° around an adjustment axis of the lever element.

19 Claims, 3 Drawing Sheets

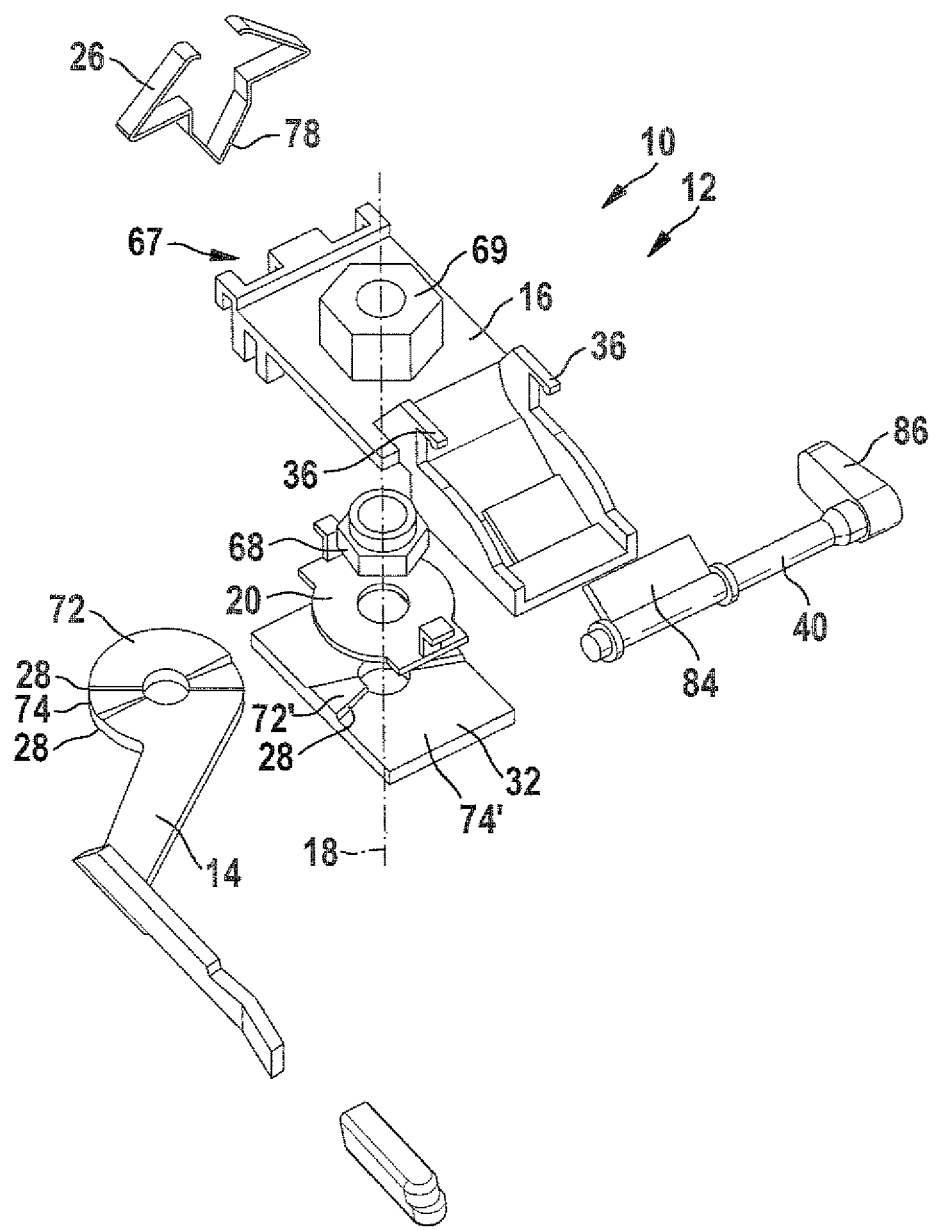

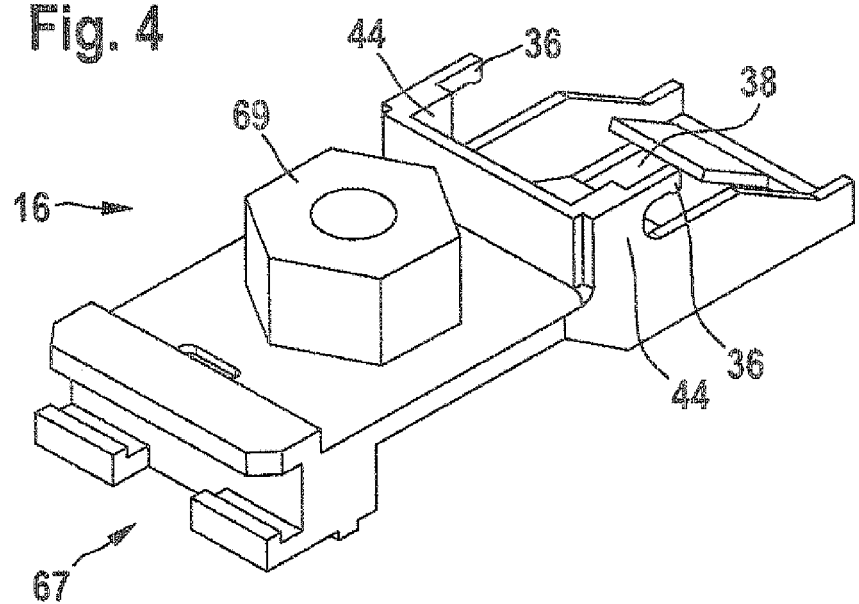
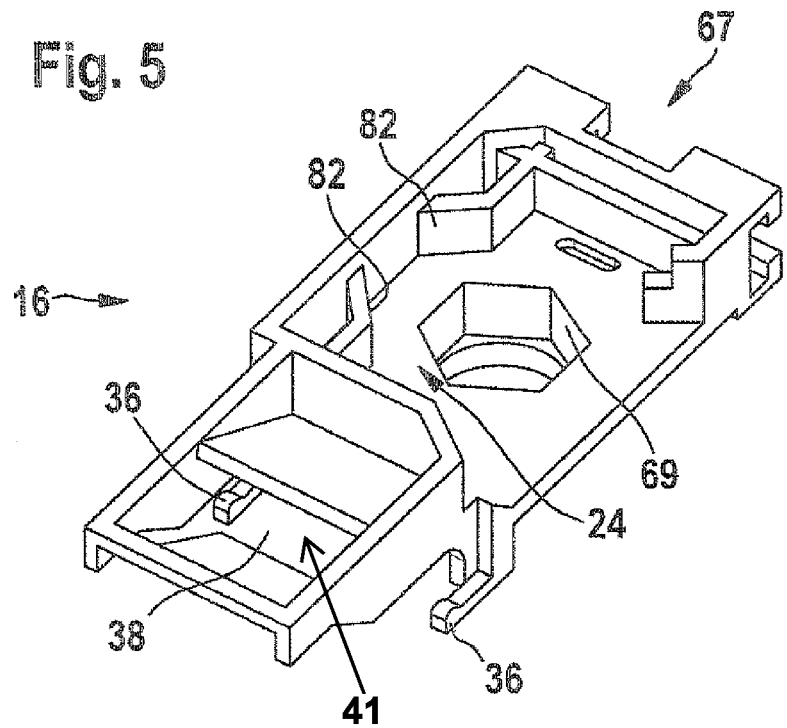

HAND-HELD POWER TOOL DEVICE

CROSS-REFERENCE TO RELATED APPLICATION

This application is based on German Patent Application 10 2008 055 065.5 filed on Dec. 22, 2008.

BACKGROUND OF THE INVENTION

1. Field of the Invention

The invention is based on a hand-held power tool device.

2. Description of the Prior Art

A hand-held power tool device, in particular a jigsaw device with an adjusting device, which has a lever element and a mounting element for accommodating the lever element, has already been proposed.

OBJECT AND SUMMARY OF THE INVENTION

The invention is based on a hand-held power tool device, in particular a jigsaw device with an adjusting device, which has a lever element and a mounting element for accommodating the lever element.

According to one proposal, the mounting element is composed of a one-piece element extending 360° around an adjustment axis of the lever element. An "adjusting device" should in particular be understood to be a device that makes it possible to change an orientation and/or a position of at least one part and/or region of a hand-held power tool that is equipped with the adjusting device in relation to another part and/or another region of the hand-held power tool. The adjusting device advantageously makes it possible to change an orientation and/or position of a base element in relation to the mounting element. In a particularly advantageous way, it is possible to change the orientation of the base element around the axis whose direction is advantageously constituted by a center point of a machining site and a main working direction and/or to change a position along the main working direction. A "lever element" should in particular be understood to be an element with which it is possible to execute a tool-free change of the orientation and/or position of the part and/or region of the hand-held power tool. A "base element" should in particular be understood to be an element that serves a machining of a work piece by orienting the hand-held power tool. In this case, the base element advantageously contacts the work piece. A "main working direction" should in particular be understood to be a direction in which the hand-held power tool normally moves during a machining of a work piece. A "mounting element" should in particular be understood to be an element that serves as a component support for several other elements. An "adjustment axis" should in particular be understood to be an axis around which a rotation of at least one element produces an adjustment of at least one other element. The expression "extending 360° around" should in particular be understood to mean that the element is of one piece, extending without interruption along at least one closed line in at least one plane extending perpendicular to the adjustment axis. The embodiment of the hand-held power tool device according to the invention enables advantageous savings of components, costs, and assembly effort.

In another proposed embodiment, the adjusting device has a spring element that is provided to load the mounting element at least during an adjustment. Preferably, the spring element stabilizes the base element in so doing. The expression "during an adjustment" should in particular be understood to mean during a time in which a user is able to move the base element. The verb "stabilizes" should in particular be understood to mean that during an adjustment as compared with fixing of the base element in place—the spring element exerts less clamping force on the base element, which prevents an adjustment of the base element caused by the force of gravity and/or another force approximately equivalent to the force of gravity. Advantageously, an external force acting on the base element is required in order to adjust the base element. The verb "provided" should in particular be understood to mean specially equipped and/or designed.

The stabilizing spring element makes the base element particularly easy to adjust.

According to another proposal, the mounting element has at least one stop region that is provided to center the lever element during a mounting of the adjusting device. A "stop region" should in particular be understood to be a region that, by means of its shape, helps to bring the lever element into a desired position during the mounting. A "mounting" should in particular be understood to mean an assembly of the hand-held power tool device and/or an installation of the hand-held power tool device in a hand-held power tool. The stop region makes it particularly easy to position the lever element in a desired location during the mounting.

According to another proposal, the adjusting device has a detent element that is provided to produce at least one detent engagement. Preferably, the detent element produces a detent engagement of a base element in at least one orientation of the base element. A "detent element" should in particular be understood to be an element that enables a detent engagement in different orientations of the base element, i.e. a releasable fixing of at least one form-locked and/or frictional, nonpositive connection. The detent engagement makes it particularly easy for a user to adjust particular preset, advantageous orientations of the base element and to firmly lock them in place by means of the adjusting device.

According to another proposal, the lever element has at least one beveled region that is provided to increase a clamping force during a movement of the lever element. An "beveled region" should in particular be understood to be a region of the lever element and/or the bottom element that has regions with different thicknesses and/or different heights in the direction of the adjustment axis. A "clamping force" should in particular be understood to be a force that, by means of an at least frictional, nonpositive engagement, prevents a movement of the base element in relation to the mounting element with a corresponding position of the lever element. By means of the increased clamping force due to the beveled region, the base element is fixed in place in a structurally simple, advantageous fashion.

In another proposed embodiment, the adjusting device has a bottom element equipped with at least one beveled region that is provided to correspond to the beveled region of the lever element in at least one position of the lever element. A "bottom element" should in particular be understood to be an element that the limits an adjusting device in the direction toward the base element and/or transmits a clamping force to a hand-held power tool housing. The verb "correspond" should in particular be understood to mean that the beveled regions of the bottom element and lever element are designed so that in at least two different orientations in relation to each other around the adjustment axis, they have at least two different overall heights in the direction of the adjustment axis. The clamping force can be advantageously changed by means of a corresponding beveled region.

According to another proposal, the mounting element has at least one fastening element that is provided to fix the adjusting device in place during a mounting of the adjusting device. A "fastening element" should in particular be understood to be an element that is able to produce a detachable—at least form-locked—connection to another element, for example the hand-held power tool housing, directly or via another element. The fastening element advantageously fixes the adjusting device in place in the hand-held power tool during the mounting.

According to another proposal, the mounting element has a baffle region, which is provided to direct a flow of air. A "baffle region" should in particular be understood to be a region with a special shape that deflects the flow of air in a particular direction. The baffle region can deflect the flow of air in an advantageous fashion.

According to another proposal, the adjusting device has an air control element that is provided to control a flow of air. An "air control element" should in particular be understood to be an element that can influence the volume and/or movement direction of the flow of air. The air control element advantageously permits a user to adjust the volume and movement direction of the flow of air.

In another proposed embodiment, the air control element is provided to control a flow of air that is directed toward a machining site. A "machining site" should in particular be understood to be a region in which, during a machining operation, a tool contacts and/or machines the work piece. By selectively controlling the flow of air, it is possible to improve a user's view of the machining site.

According to another proposal, the air control element is provided to fix the adjusting device in place during a mounting of the adjusting device, thus making it possible to advantageously reduce the structural complexity and number of components.

According to another proposal, the mounting element has at least one holding element that is provided to prevent a lateral movement of the air control element. A "holding element" should in particular be understood to be an element that serves to produce a form-locked connection between at least two surfaces. A "lateral movement" should in particular be understood to be a movement in a direction perpendicular to the main working direction and perpendicular to the direction of the adjustment axis. The prevention of lateral movements can advantageously prevent the air control element from falling out.

The invention is also based on a hand-held power tool equipped with a hand-held power tool device; it would be conceivable to use the hand-held power tool device to operate all hand-held power tools deemed appropriate by those skilled in the art, in particular drills rotary hammers, saws, planers, screwdrivers, routers, grinders, angle grinders, and/or multifunction tools, making it possible to produce a hand-held power tool that can be used in a particularly flexible way.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 3 is a perspective, exploded representation of the hand-held power tool device from FIG. 1;

FIG. 4 is a perspective top view of the mounting element; and

FIG. 5 is a bottom view of the mounting element from FIG. 4.

DESCRIPTION OF THE PREFERRED EMBODIMENT

Figure 1:
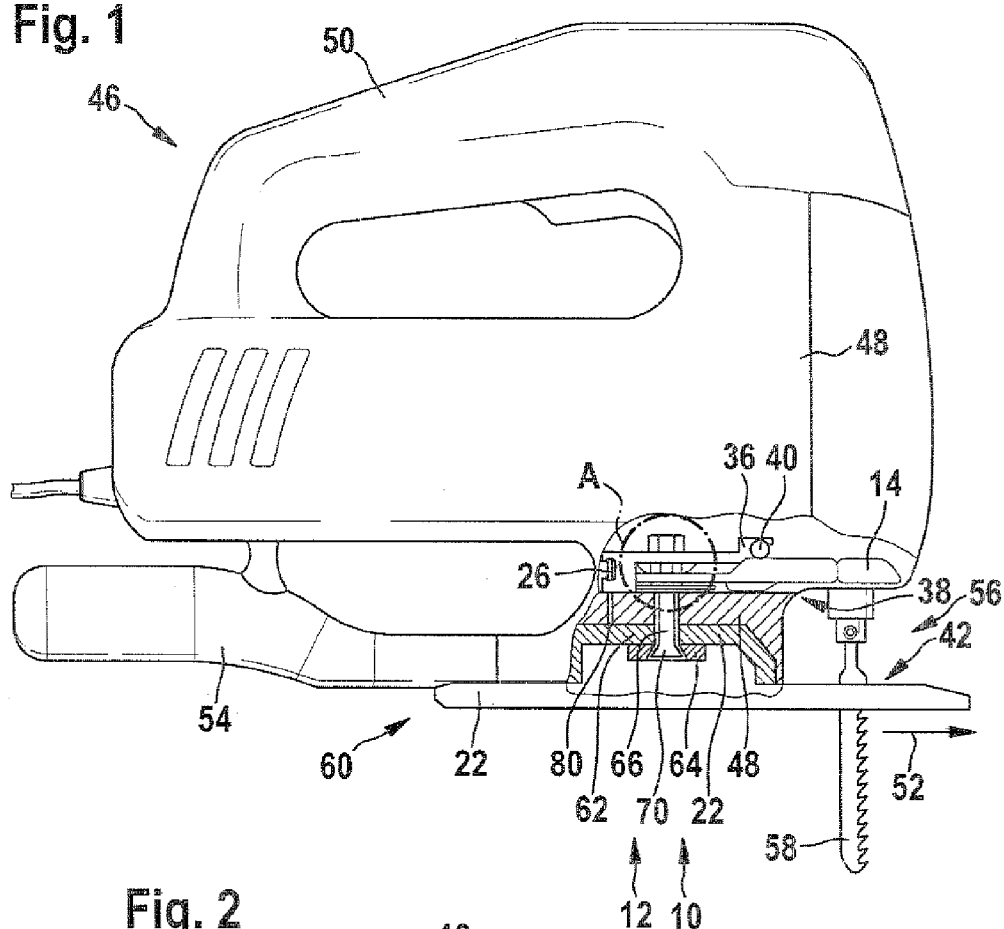
FIG. 1 shows a hand-held power tool with a hand-held power tool device.

FIG. 1 shows a hand-held power tool 46 equipped with a hand-held power tool device 10, with a break-away depiction of a hand-held power tool housing 48. The hand-held power tool 46 is embodied as a jigsaw. It has a handle 50 that is oriented in a main working direction 52, a dust removal device 54 in a rear region of the hand-held power tool 46 remote from a machining site 42, a tool-holding region 56 in a front region of the hand-held power tool 46, with a tool 58 and a base element 22. The base element 22 is situated in a lower region 60 of the hand-held power tool 46 remote from the handle 50 and extends along the main working direction 52. It has a semitubular frictional engagement region 62, a semicylindrical frictional engagement element 64, and a clamping screw 66. By means of the clamping screw 66, the hand-held power tool device 10 produces a clamping force on the frictional engagement element 64, thus producing a frictional engagement between the frictional engagement region 62 and the frictional engagement element 64.

Figure 2:
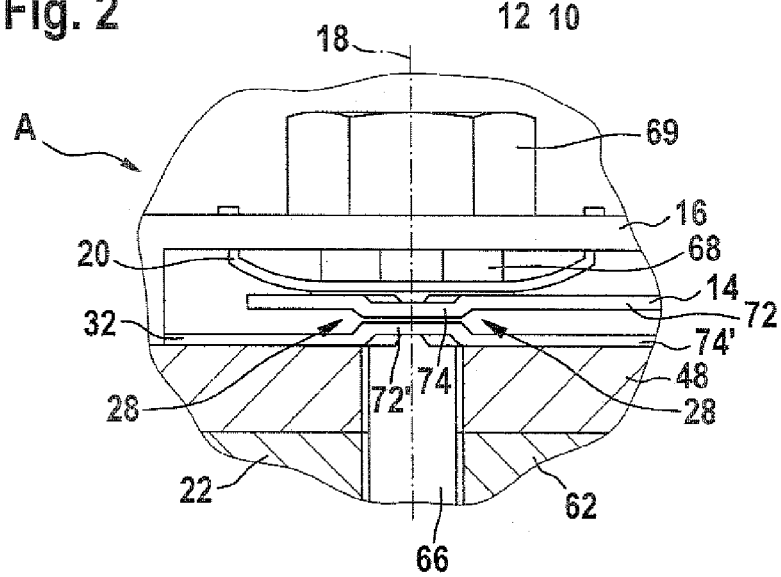
FIG. 2 shows a detail A of the hand-held power tool device from FIG. 1.

FIG. 2, which shows a detail A from FIG. 1, and FIG. 3, which is a perspective, exploded representation of FIG. 1, show the hand-held power tool device 10, which is embodied in the form of a jigsaw device equipped with an adjusting device 12 and has a lever element 14 and a mounting element 16 for accommodating the lever element 14. Referring now to FIGS. 1-3, the mounting element 16 is composed of a one-piece element or component extending 360° around an adjustment axis 18 of the lever element 14. In the rear region of the mounting element 16 with reference to the main working direction 52, the mounting element 16 has a receiving region 67 that is provided for a detent element 26 and is embodied in the form of an intermittent T-shaped groove as best seen in FIG. 4. In the main working direction 52 in front of it, a hexagonal receiving region 69 is provided for a clamping nut 68 and in front of that, there are two fastening elements 36 that are situated at a left and right outer side of the mounting element 16. A baffle region 38 is situated in a front region of the mounting element 16.

In the installed state, the mounting element 16 is situated as the uppermost element along the adjustment axis 18, i.e. at the end of the adjustment axis 18 oriented toward the handle 50. Under the mounting element 16, the clamping screw 66 extends along the adjustment axis 18. Under the mounting element 16, the hand-held power tool device 10 has the following items in sequence: the clamping nut 68, a spring element 20, the lever element 14, and a bottom element 32. In the assembled state, the latter is adjoined on its underside by the hand-held power tool housing 48, the semitubular frictional engagement region 62 of the base element 22 and the frictional engagement element 64 (FIG. 1). The clamping screw 66 has a screw head 70 situated in the frictional engagement element 64. The bottom element 32 is inserted in a form-locked manner into the mounting element 16 and is thus secured to the mounting element 16 in a nonrotating fashion (see FIG. 5).

The lever element 14 and the bottom element 32 each have four beveled regions 28 that are oriented radial to the adjustment axis 18, pairs of which are situated mirror-symmetrical to the adjustment axis 18. Two respective beveled regions 28 connect two annular regions 72, 72', 74, 74' situated mirror-symmetrical to the adjustment axis 18, which are situated at different heights—namely one height that is elevated vertically in relation to the adjustment axis 18 and one height that is recessed in relation to it—with regard to a main span of the bottom element 32 and lever element 14, respectively. The different heights can increase a clamping force with a movement of the lever element 14. In addition, the beveled regions 28 of the lever element 14 rotate in relation to the bottom element 32.

In a working position of the lever element 14 depicted in FIGS. 1 and 2, in which the lever is parallel to the main working direction 52 and the region 74 of the lever element 14 with a recessed height in relation to a main span comes to rest on the region 72' of the bottom element 32 with an elevated height in relation to a main span, a height along the adjustment axis 18 of the two elements 14, 32 together is the greatest of all of the possible positions of the lever element 14, spreading open the adjusting device. 12. The bottom element 32 and the lever element 14 are thus symmetrical to a contact surface in a contact region. A total clamping height (FIG. 1) along the adjustment axis 18 is composed of the heights of the spring element 20, the lever element 14, the region of the hand-held power tool housing 48 that encompasses the clamping screw 66, the height of the base element 22 in the frictional engagement region 62, and the height of the frictional engagement element 64. In this case, the total clamping height is equal in height to a screw depth between the screw head 70 of the clamping screw 66 and the clamping nut 68, thus producing a clamping force in the working position of the lever element 14. In this case, the clamping screw 66 reaches all the way through the elements 64, 62, 48, 32, 14, and 20. The clamping force thus produces a frictionally engaged connection between the frictional engagement region 62 of the base element 22, the hand-held power tool housing 48, and the frictional engagement element 64.

In an adjustment position of the lever element 14 in which the lever element 14 is moved clockwise in relation to the working position, viewed from above, the beveled regions 28 of the bottom element 32 correspond to those of the lever element 14, as a result of which the lever element 14 and bottom element 32 come to rest against each other in a precisely fitting fashion. In this case, the two regions 72, 72' with the elevated height and the two regions 74, 74' with the recessed height respectively come to rest against one another. A total clamping height is lower than in the working position of the lever element 14 and the stress on the clamping screw 66 is relieved. During an adjustment of the base element 22, the spring element 20 stabilizes the base element 22 by means of the mounting element 16. In addition, the spring element 20 exerts a residual stress on the clamping screw 66, thus preventing slight forces from moving the base element 22.

The adjusting device 12 has the detent element 26, which produces a detent engagement of the base element 22 of the hand-held power tool 46 in at least one orientation of the base element 22. The detent element 26 is situated in the rear receiving region 67. The detent element 26 is embodied as a bent spring element in the shape of a triangle with a missing corner and on a closed leg of the triangle, has a bulge 78 pointing out from the center of the triangle (see FIG. 3). The bulge 78 has a tip that, in an assembled state, contacts the semitubular frictional engagement region 62 of the base element 22 (see FIG. 1). The semitubular frictional engagement region 62 has indentations 80 that are situated so that the tip of the bulge 78 of the detent element 26 engages in them in detent fashion by extending through a recess in the hand-held power tool housing 48. The indentations 80 are situated on a circular curve. The detent element 26 engages in detent fashion in the indentations 80 at adjustment angles of the base element 22 around the main working direction 52 of 0°, ±22.5°, and ±45°.

FIG. 4 shows regions of the mounting element 16 from above. The two fastening elements 36 of the mounting element 16 fix the adjusting device 12 in place during a mounting of the adjusting device 12. To this end, the fastening elements 36 are embodied as catches that embrace an air control element 40 from above, which element belongs to the adjusting device 12, is shown in FIG. 3, and is in turn fixed in place on the hand-held power tool housing 48 by means of catches of the hand-held power tool housing 48 that are not shown in detail. Consequently, the air control element 40 fixes the adjusting device 12 in place during a mounting of the adjusting device 12. Two holding elements 44 of the mounting element 16, which are embodied as flat surfaces, prevent a lateral movement of the air control element 40, thus preventing the air control element 40 from falling out of the hand-held power tool device 10 and out of the hand-held power tool 46.

FIG. 5 is a bottom view of the mounting element 16. A stop region 24 of the mounting element 16 centers the lever element 14 during a mounting of the adjusting device 12. To this end, the stop region 24 is equipped with stop surfaces 82 that are oriented perpendicular to each other. If the lever element 14 is slid into the mounting element 16 during a mounting, it can be aligned by means of the stop surfaces 82.

The baffle region 38 of the mounting element 16 directs a flow of air so that the flow of air is aimed at the machining site 42. The baffle region 38 is composed of an opening 41 in the front region of the mounting element 16. (See FIG. 5) By means of the air control element 40, an operator can control a volume of the flow of air. As shown in FIG. 3, the air control element 40 is composed of an axle that is equipped with a control flap 84 and a control lever 86. The air control element 40 protrudes through the housing so that it can be controlled by the operator.

The foregoing relates to a preferred exemplary embodiment of the invention, it being understood that other variants and embodiments thereof are possible within the spirit and scope of the invention, the latter being defined by the appended claims.

The invention claimed is:

1. A hand-held power tool device for a hand held power tool including a tool and an adjustable base through which the tool machines a workpiece at a machining site defined by a location of the tool at the workpiece, the hand-held power tool device comprising:
    an adjusting device including a lever element configured to rotate about an adjustment axis defined by the adjusting device and a mounting element for accommodating the lever element, wherein the mounting element includes a one-piece element disposed around the adjustment axis, wherein the one-piece element includes a receiving region disposed at an end of the one-piece element; and
    a detent element disposed at the receiving region, the detent element configured to engage a corresponding feature of the hand-held power tool device to fix the adjustable base at a predetermined position, wherein the mounting element has a baffle region including an opening configured to deflect air flow toward the machining site of the hand-held power tool.

2. The hand-held power tool device according to claim 1, wherein the adjusting device has a spring element that is provided to load the mounting element in at least one position.

3. The hand-held power tool device according to claim 2, wherein the mounting element has at least one stop region that is provided to center the lever element during a mounting of the adjusting device.

4. The hand-held power tool device according to claim 3, wherein the lever element has at least one beveled region that assists to increase a clamping force during a movement of the lever element.

5. The hand-held power tool device according to claim 4, wherein the adjusting device has a bottom element equipped with at least one beveled region that is provided to correspond to the at least one beveled region of the lever element in at least one position of the lever element.

6. The hand-held power tool device according to claim 5, wherein the mounting element has at least one fastening element that is provided to fix the adjusting device in place during installation of the adjusting device in the hand-held power tool.

7. The hand-held power tool device according to claim 1, wherein the mounting element has at least one stop region that is provided to center the lever element during a mounting of the adjusting device.

8. The hand-held power tool device according to claim 1, wherein the lever element has at least one beveled region that assists to increase a clamping force during a movement of the lever element.

9. The hand-held power tool device according to claim 8, wherein the adjusting device has a bottom element equipped with at least one beveled region that is provided to correspond to the at least one beveled region of the lever element in at least one position of the lever element.

10. The hand-held power tool device according to claim 1, wherein the mounting element has at least one fastening element that is provided to fix the adjusting device in place during installation of the adjusting device in the hand held power tool.

11. The hand-held power tool device according to claim 1, wherein the adjusting device has an air control element configured to control a volume of the flow of air toward the machining site of the hand-held power tool device.

12. The hand-held power tool device according to claim 11, wherein the air control element is operatively coupled to a fastening element configured to fix the adjusting device in place during installation of the adjusting device in the hand held power tool.

13. The hand-held power tool device according to claim 11, wherein the mounting element has at least one holding element that is provided to prevent a lateral movement of the air control element.

14. The hand-held power tool device according to claim 11, wherein the receiving region is disposed at a first end of the one piece element and the air control element is disposed at a second end of the one piece element.

15. The hand-held power tool device according to claim 14, wherein the air control element includes an adjustable control flap configured to move from a first position to a second position to control a volume of the flow of air toward the machining site of the hand-held power tool.

16. The hand-held power tool device according to claim 15, wherein the receiving region includes a groove configured to locate the detent element at a fixed location.

17. The hand-held power tool device according to claim 16, wherein the detent element comprises a spring element.

18. The hand-held power tool device according to claim 16, wherein the mounting element includes a receiving region configured to mount the lever element for rotational displacement with respect to the mounting element.

19. A hand-held power tool equipped with the hand-held power tool device according to claim 1.

* * * * *